US012613497B2

(12) United States Patent
Joly

(10) Patent No.: US 12,613,497 B2
(45) Date of Patent: Apr. 28, 2026

(54) CHRONOGRAPH MECHANISM FOR A HOROLOGICAL MOVEMENT AND TIMEPIECE COMPRISING SUCH A MECHANISM

(71) Applicant: Blancpain SA, Le Brassus (CH)

(72) Inventor: Lilian Joly, Sirod (FR)

(73) Assignee: Blancpain SA, Le Brassus (CH)

( * ) Notice: Subject to any disclaimer, the term of this patent is extended or adjusted under 35 U.S.C. 154(b) by 385 days.

(21) Appl. No.: 18/508,304

(22) Filed: Nov. 14, 2023

(65) Prior Publication Data

US 2024/0210893 A1 Jun. 27, 2024

(30) Foreign Application Priority Data

Dec. 21, 2022 (EP) .................................... 22215514

(51) Int. Cl.
*G04F 7/08* (2006.01)

(52) U.S. Cl.
CPC .................................. *G04F 7/0809* (2013.01)

(58) Field of Classification Search
CPC ......... G04F 7/08; G04F 7/0804; G04F 7/0809
See application file for complete search history.

(56) References Cited

U.S. PATENT DOCUMENTS 3,796,041 A * 3/1974 Boult .................... G04F 7/0814 368/106
3,901,020 A * 8/1975 Capt ...................... G04F 7/0852 368/106
7,331,706 B2 * 2/2008 Gabathuler ........... G04F 7/0809 368/106
11,860,583 B2 * 1/2024 Martel .................. G04F 7/0804
2007/0019509 A1 * 1/2007 Gabathuler ........... G04F 7/0809 368/106

(Continued)

FOREIGN PATENT DOCUMENTS

CH 585 432 B5 2/1977
EP 1 960 848 B1 6/2012
EP 1 746 471 B1 9/2019

(Continued)

OTHER PUBLICATIONS

Office Action issued Nov. 5, 2024, in corresponding Japanese Patent Application No. 2023-199038, 2 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A chronograph mechanism including a zero-reset mechanism for resetting a chronograph counter to zero, including a zero-reset member and a hammer shaped to cooperate with the zero-reset member. The zero-reset member is a snail cam including a cam track extending in a spiral. The hammer can be displaced by the zero-reset control between a rest position in which the hammer is not in contact with the cam path and a zero-reset position in which the hammer is in contact with the cam path and holds the zero-reset member in the reference position, the hammer generating a driving torque on the zero-reset member between the rest position and the zero-reset position.

15 Claims, 6 Drawing Sheets

(56) References Cited

U.S. PATENT DOCUMENTS

2008/0291785 A1 11/2008 Perret et al.

FOREIGN PATENT DOCUMENTS

| | | | |
|---|---|---|---|
| JP | S48-30463 | A | 4/1973 |
| JP | 2007-24899 | A | 2/2007 |
| JP | 2009-517645 | A | 4/2009 |
| JP | 2016-502081 | A | 1/2016 |
| JP | 2020-500312 | A | 1/2020 |

OTHER PUBLICATIONS

European Search Report issued May 31, 2023 in European Application 22215514.5 filed on Dec. 21, 2022, 3 pages (with English Translation of Categories of Cited Documents).

* cited by examiner

CHRONOGRAPH MECHANISM FOR A HOROLOGICAL MOVEMENT AND TIMEPIECE COMPRISING SUCH A MECHANISM

CROSS-REFERENCE TO RELATED APPLICATION

This application claims priority to European Patent Application No. 22215514.5 filed on Dec. 21, 2022, the entire disclosure of which is hereby incorporated herein by reference.

TECHNICAL FIELD OF THE INVENTION

The present invention relates to a chronograph mechanism for a horological movement.

More particularly, the invention relates to a chronograph mechanism including a zero-reset mechanism.

The invention further relates to a timepiece including such a chronograph mechanism.

TECHNOLOGICAL BACKGROUND

Chronograph mechanisms enable time to be measured on demand via several chronograph counters, for example minutes and seconds counters.

Chronograph mechanisms typically include a zero-reset mechanism for resetting the chronograph counters to zero, i.e. for repositioning them in a reference position, so that time can be measured again on demand.

Conventionally, such a zero-reset mechanism consists of a zero-reset control that can be operated by the user, for example via a push-button or an actuating pin accessible from outside the middle in which the horological movement is mounted.

The zero-reset control cooperates directly or indirectly with a zero-reset hammer which strikes the zero-reset cams carried by the various chronograph counters.

The chronograph counter and associated hand are reset to zero by the hammer pressing on the surface of the zero-reset cam, generating a driving torque that modifies the position of the chronograph counter concerned until it returns to a reference position determined by the geometry of the zero-reset hammer and cam.

Zero-reset cams have been known to have an eccentric or "snail" shape, formed by a single spiral, causing the reset to always take place in the same direction. An example of such a zero-reset cam of the prior art is shown in FIG. 1.

These snail cams lack precision and cannot guarantee that the counter will be reset to zero in any angular position of the cam. Indeed, when the snail cam is in an angular position very close to its reference position, for example in an angular position corresponding to a rotation of the hand by a fraction-of-a-second, the existing clearances between the various parts may imply a sliding of the hammer on the cam, resulting in a backward movement of the hand, visible to the user, instead of being driven in the direction in which the hand is reset to zero.

To overcome these drawbacks, heart-shaped zero-reset cams have been developed, featuring two identical spirals but provided in opposite directions, hence the heart shape, as shown in the reference manual by C.-A. Reymondin et al, "Théorie d'horlogerie", Fédération des Ecoles Techniques, Edition 2015, p.238.

Such a zero-reset cam is shown in FIG. 2.

The hammer for resetting such a heart shape to zero includes an arm shaped like a horse's hoof (visible in FIG. 2). At the end of the hammer's stroke (which is linear or circular), the arm comes to rest on a double lobe formed by the heart-piece to ensure that it is held in a stable position corresponding to the zero-reset position of the counter and of the corresponding hand.

This type of zero-reset mechanism is widely known, but suffers from several drawbacks.

Firstly, the positioning of the hand, and in particular of the seconds hand, when returning to zero, is often random and lacking in precision. This is particularly detrimental in the case of a jumping seconds hand, which is supposed to be in a precise angular position every second in order to be facing a graduation on the dial.

Secondly, given the geometry of the heart-piece and of the hammer, the friction forces at their interface are not constant. The result is non-uniform wear of these parts, which is detrimental to the long-term reliability of the mechanism.

Thirdly, in certain angular positions of the heart-piece, the hammer rubs against the heart-piece with a sharp edge, as illustrated in FIGS. 11-29 of the aforementioned manual, which increases stress concentration, wear and mechanical fatigue of the parts.

Fourthly, the inertia of the heart-piece acquired during its rotation means that it is not immediately locked in the reference position at the end of the stroke of the hammer, but remains, before coming to rest, animated by damped oscillations which impair the perception of precision expected by an experienced user.

There is thus a need to improve chronograph mechanisms and in particular the mechanisms for resetting the counters of such chronograph mechanisms to zero.

SUMMARY OF THE INVENTION

In this context, one of the aims of the invention is to provide a chronograph mechanism that solves at least one of the aforementioned problems.

One of the aims of the invention is to provide a zero-reset mechanism that offers precise zero-resetting, in particular of a chronograph seconds hand positioned exactly opposite a predetermined graduation on the dial.

One of the aims of the invention is to provide a reliable and secure zero-reset mechanism that enables the chronograph to be reset to zero in its direction of travel, while avoiding the phenomenon of the hands moving backwards when the zero-reset hammer strikes the zero-reset cams.

In this context, the invention relates to a chronograph mechanism for a horological movement comprising:

- a chronograph counter with a shaft and a hand that rotates as one with the shaft,
- a zero-reset mechanism for resetting said chronograph counter to zero, comprising a zero-reset member integral with the shaft and a hammer shaped to cooperate with the zero-reset member and to generate a driving torque under the action of a zero-reset control until the zero-reset member is positioned in a reference position by rotation in the direction of travel of the chronograph counter;

characterised in that the zero-reset member is a snail cam having a cam track extending spirally around said shaft of the chronograph counter from a proximal end defining a zone of minimum radius with respect to the shaft to a distal end defining a zone of maximum radius with respect to the shaft;

in that said hammer can be displaced by the zero-reset control between a rest position in which the hammer is not in contact with the cam track and a zero-reset position in which the hammer is in contact with the cam track and holds the zero-reset member in said reference position, the hammer generating a driving torque on the zero-reset member between the rest position and the zero-reset position;

in that the hammer cooperates with guide members shaped to guide an outward movement of the hammer along a first path between the rest position and the zero-reset position and to guide a return movement of the hammer along a second path between the zero-reset position and the rest position, the first path and the second path of the hammer being non-coincident.

Advantageously, the return path (i.e. the second path) is different from the outward path (i.e. the first path), so that the return path is at least substantially offset from the first path.

The difference between the outward path and the return path of the hammer, particularly at the portion coming into contact with the cam track, ensures a sufficient bearing surface on the cam track when the chronograph counter is reset to zero, particularly when the counter is stopped in a position corresponding to the start of the timed minute. This ensures that the hammer-cam contact is made on a surface of the spiral and not on the nose of the cam. This ensures that the counter returns to its reference position on the correct side.

In addition to the features mentioned in the preceding paragraph, the chronograph mechanism according to the invention may have one or more complementary features from among the following, considered either on an individual basis or according to any combination technically possible:

- the guide members are shaped to guide the hammer along a first rectilinear unidirectional path between the rest position and the zero-reset position and along a second multidirectional path having at least two different directions between the zero-reset position and the rest position;
- the guide members are shaped to guide the hammer along a first curvilinear path between the rest position and the zero-reset position and along a second path that is different from the first curvilinear path between the zero-reset position and the rest position;
- the guide members comprise a disengageable guide yoke shaped to be inactive during the outward movement of the hammer and active during the return movement of the hammer;
- the disengageable guide yoke comprises a guide cam cooperating with a guide peg integral with the hammer, said guide cam comprising a first portion shaped to disengage the guide yoke during the outward movement of the hammer and a second portion shaped to guide the hammer during the return movement of the hammer;
- the disengageable guide yoke cooperates with a guide yoke spring biased to reposition said disengageable yoke in a neutral equilibrium position in abutment against a yoke stop;
- the hammer comprises an arm having, at its free end, an inclined face configured to come into contact with the cam track of the zero-reset member and generate a driving torque under the action of the zero-reset control until the zero-reset member is positioned in the reference position;
- the arm has a stop surface configured to form an angular positioning stop for the zero-reset member during the zero-reset operation;
- the arm has an end beak forming a protrusion extending the inclined face, projecting from the stop surface;
- the zero-reset member comprises a connecting portion connecting the proximal end and the distal end, and which does not belong to the cam track, said connecting portion comprising a recess forming a clearance for receiving and housing the end beak when the hammer is in the zero-reset position;
- the second portion of the guide cam is shaped to disengage the end beak from the recess during the return movement of the hammer and so that the end beak bypasses the distal end of the zero-reset member;
- the chronograph counter is a seconds counter;
- the mechanism also comprises a minute counter having a minute counter shaft, a minutes hand rotating as one with the minute counter shaft, the minute counter shaft carrying a second heart-shaped zero-reset member;
- the hammer comprises a second arm cooperating with the second zero-reset member, the second arm being configured to generate a driving torque under the action of the zero-reset control until the second zero-reset member is positioned in a reference position.

Another aspect of the invention relates to a horological movement including such a chronograph mechanism according to the invention.

Another aspect of the invention relates to a timepiece including such a horological movement according to the invention, including a chronograph mechanism according to the invention.

The timepiece is preferably a wristwatch including a watch case configured to receive and house the horological movement according to the invention.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

Figure 3:
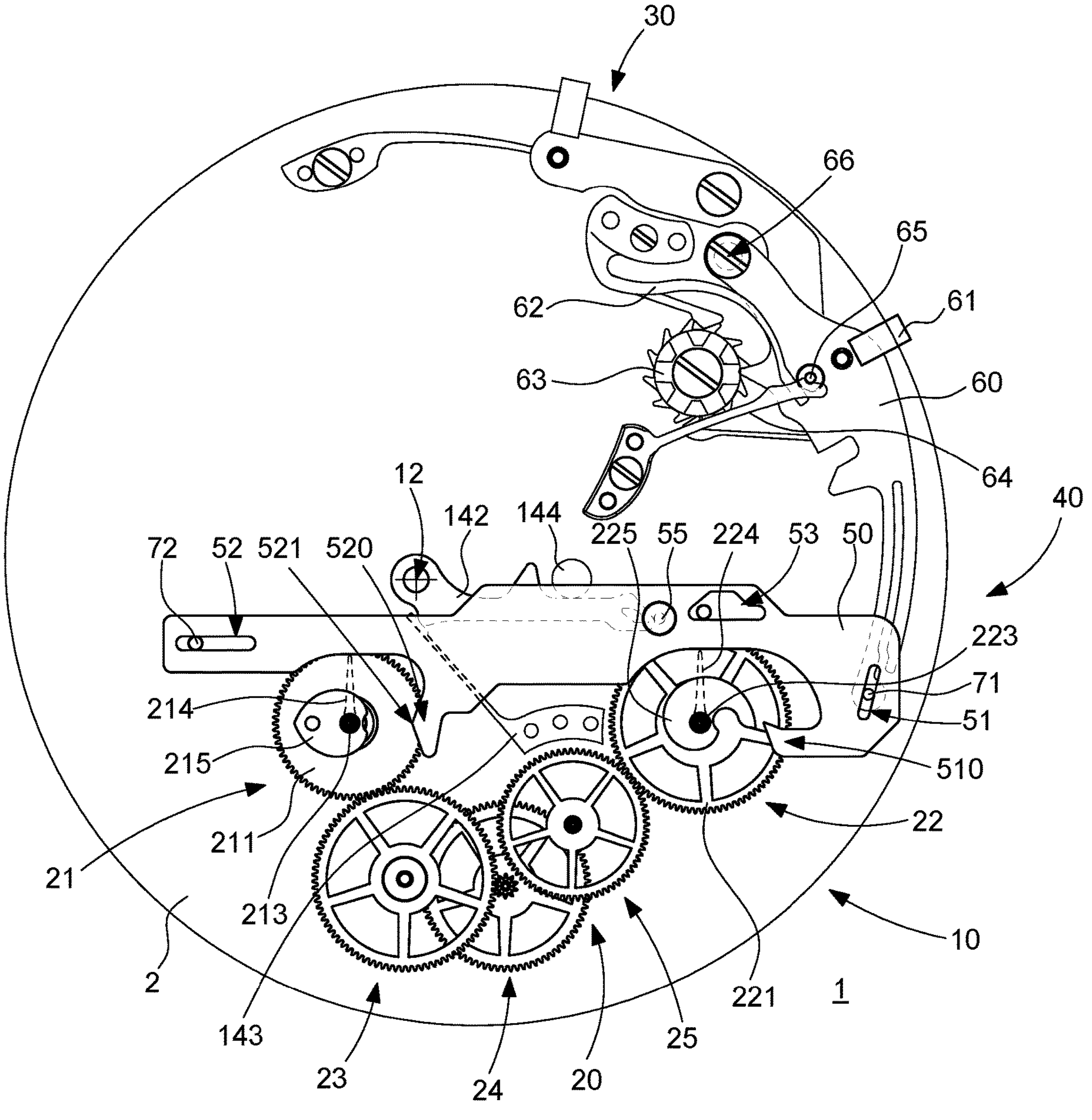
FIG. 3 is a schematic 2D representation of a chronograph mechanism of a horological movement according to the invention, which chronograph mechanism is in the neutral rest position.

FIG. 3 shows a schematic, plan view of a chronograph mechanism 10 integrated into a horological movement 1 according to the invention.

FIG. 3 in particular shows the chronograph mechanism 10 in a neutral position, i.e. in a non-activated position. It should be noted that the chronograph counters are in their reference position by way of example.

Figure 5:
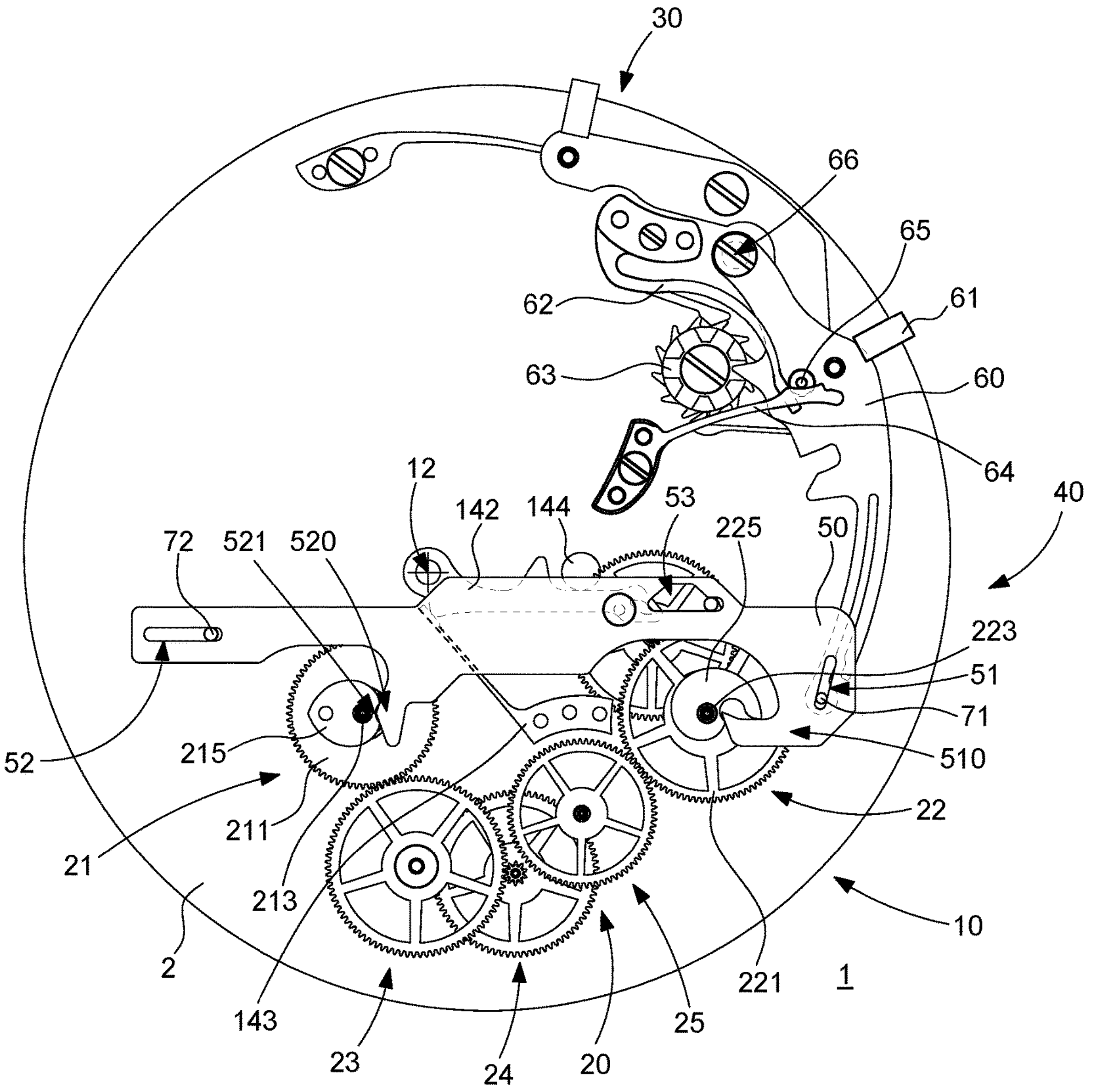
FIG. 5 is a schematic 2D representation of the chronograph mechanism of the horological movement according to the invention, which chronograph mechanism is in an activated zero-reset position.

FIG. 5 illustrates the same chronograph mechanism 10 in an activated zero-reset position in which the counters are repositioned to their reference position, irrespective of their initial position.

The horological movement 1 according to the invention conventionally comprises a plate 2 acting as a support for the various elements of the horological movement 1, in particular for a running train (not shown) dedicated to the division of time which is driven by an energy source (not shown).

The energy source 50 is, for example, a barrel which constitutes a reserve of energy to power the running train.

Conventionally, the running train drives the hands of a time display, in particular an hour hand cooperating with an hour graduation, a minute hand cooperating with a minute graduation, and a seconds hand, or trotteuse hand, cooperating with a seconds graduation.

The running train is conventionally regulated by a regulating member.

The regulating member conventionally includes an oscillator and an escapement. The oscillator can be an electrical or mechanical oscillator.

For example, the oscillator is a mechanical sprung-balance type oscillator. Such a sprung balance has, for example, an oscillation frequency of between 2.5 and 4 Hz.

For example, the oscillator is a high-frequency electrical or mechanical oscillator, i.e. oscillating at a frequency greater than 4 Hz.

For example, the oscillator is a high-frequency electrical or mechanical oscillator, i.e. oscillating at a frequency greater than or equal to 5 Hz.

The chronograph mechanism 10 includes a chronograph train 20 which can be kinematically connected, on request, with the running train via a coupling (not shown) controlled by a chronograph on/off control member 30.

According to an alternative embodiment, the coupling is a yoke coupling enabling a coupling wheel to be pivoted.

According to an alternative embodiment, the coupling is a vertical coupling.

According to another alternative embodiment, the coupling is a differential coupling cooperating with a coupling yoke controlled by the chronograph start/stop control member in order to block one of the differential coupling inputs.

Conventionally, the chronograph train 20 comprises at least one chronograph counter.

With reference to FIGS. 3 and 5, the chronograph train 20 comprises a first chronograph counter formed by a seconds counter 22 and a second chronograph counter formed by a minute counter 21.

The minute counter 21 comprises a minute counter wheel 211 coupled to a shaft 213, referred to as the minute counter shaft, driving a chronograph minute hand 214 (shown by way of a dotted line in FIG. 3).

The seconds counter 22 comprises a seconds counter wheel 221 coupled to a shaft 223, referred to as the seconds counter shaft, driving a chronograph seconds hand 224 (shown by way of a dotted line in FIG. 3).

Preferably, the minute counter wheel 211 is integral with the shaft 213 of the minute counter 21, and the seconds counter wheel 221 is frictionally mounted on the shaft 223 of the seconds counter 22. Of course, a reverse configuration is also possible without leaving the context of the invention.

According to an alternative embodiment, the minute counter wheel 211 and the seconds counter wheel 221 are friction-mounted on their respective shafts 213, 223.

The chronograph train 20 may also include an additional fraction-of-second counter (not shown), also known as a foudroyante seconds counter.

The chronograph train 20 can include intermediate chronograph wheel sets 23, 24, 25 in order to obtain the desired ratios between the various counters 21, 22 of the chronograph mechanism 10. The chronograph train 20 can include more intermediate wheel sets depending on the needs and architectures of the movement and the layout of the minute counter 21, seconds counter 22 and optionally of the foudroyante seconds counter on the plate 2 of the horological movement 1.

The chronograph mechanism 10 also features a mechanism 40 for resetting the minute counter 21 and seconds counter 22 to zero, and more specifically for resetting the hands 214, 224 associated with these counters 21, 22 to zero.

The zero-reset mechanism 40 comprises zero-reset members 215, 225 integral with the shafts 213, 223 of the chronograph counters 21, 22. The zero-reset members 215, 225 cooperate with a hammer 50 to position them in a reference position and reset the hands 214, 224 of the counters 21, 22 to zero.

The zero-reset members 215, 225 of the minute counter 21 and of the seconds counter 22 are, for example, zero-reset cams in the shape of a snail, heart or similar, whose shape enables the hands 214, 224 to be repositioned in a reference position at the end of the stroke of the hammer 50.

In the example shown in FIGS. 3 to 11, the zero-reset member 215 of the chronograph minute counter 21 is, for example, a heart-piece with two identical spirals placed in opposite directions. In the remainder of the description, the zero-reset member 215 of the minute counter 21 will simply be referred to as the heart cam 215.

According to the invention, the zero-reset member 225 of the chronograph seconds counter 22 is a snail-shaped cam with a single spiral shape. In the remainder of the description, the zero-reset member 225 of the seconds counter 22 will simply be referred to as the snail cam 225.

Figure 4:
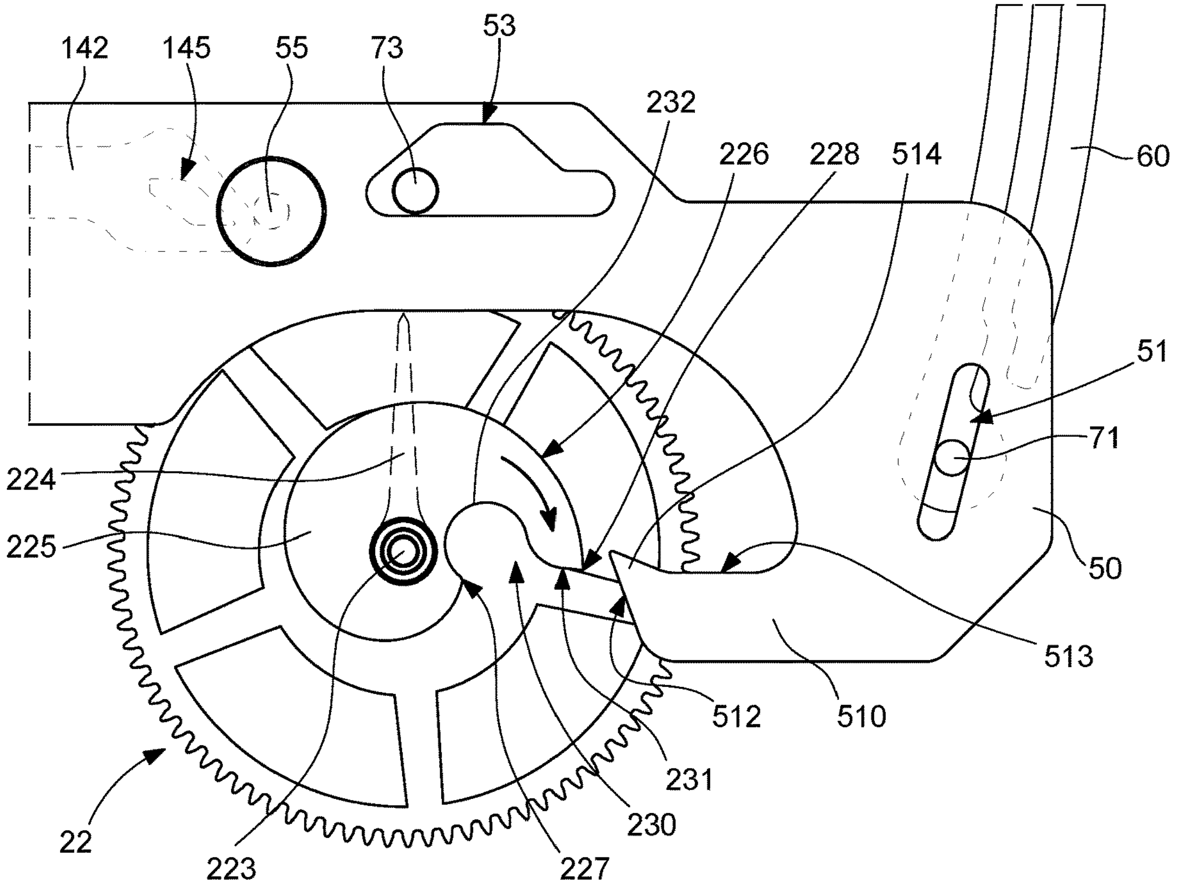
FIG. 4 is a detailed view of a portion of the chronograph mechanism illustrated in FIG. 3, showing in particular a first arm of a zero-reset hammer.

With reference to FIG. 4, illustrating more precisely the seconds counter 22 and the hammer 50 in a neutral rest position, in the same way as FIG. 3, the snail cam 225 delimits a cam track 226 extending radially in a spiral around the shaft 223 of the seconds counter 22, from a proximal end 227, defining a zone of minimum radius of the cam track 226 with respect to the shaft 223, to a distal end 228, defining a zone of maximum radius of the cam track 226 with respect to the shaft 223. The cam track 226 defines the outer track of the snail-shaped cam 225 on which the hammer 50 comes to bear in order to impose a driving torque on the shaft 223.

The distal end 228 and the proximal end 227 of the cam track 226 are connected by a connecting portion 230 not forming part of the cam track 226. In the example shown, the connection portion 230 has a generally S-shaped form extending in a radial direction relative to the shaft 223 of the seconds counter 22.

The connection portion 230 has a recess 232 located close to the proximal end 227. The recess 232 creates a clearance suitable for receiving a portion of the hammer 50 at the end of its stroke (zero-reset position), and in particular a protruding end of a first arm 510.

The connection portion 230 can also include an additional bearing surface 231 located close to the distal end 228, so as to extend the area intended to come to abut against the hammer 50 when the snail cam 225 is reset to zero.

The zero-reset mechanism 40 includes a zero-reset control 60 that can be operated by the user, for example via a push-button or an actuating pin 61. The zero-reset control 60 can rotate about an axis of rotation 66 and cooperates directly or indirectly with the zero-reset hammer 50, which in turn acts on the cams 215, 225 to reset the hands 214, 224 of the associated counters 21, 22 to zero.

As shown in FIGS. 3 and 5, the zero-reset control 60 cooperates with a resilient zero-reset element 62 configured to reposition the zero-reset control 60 to the neutral rest position (FIG. 3) between each user operation. Repositioning the zero-reset control 60, under the resilient effect of the resilient element, repositions the hammer 50 in the neutral position.

The zero-reset mechanism 40 also includes a retaining member 64 to secure the zero-reset mechanism 40 and ensure full actuation of the hammer 50 as far as its zero-reset position. The retaining member 64 is configured to momentarily retain the actuation of the zero-reset control 60, and thus of the hammer 50, until a certain force is applied to the zero-reset control 60.

The retaining member 64 is a safety member that prevents unintentional resetting of the hands 214, 224 of the chronograph mechanism 10 to zero. The retaining member 64 has a dynamic behaviour similar to that of a mechanical fuse.

Figure 1:
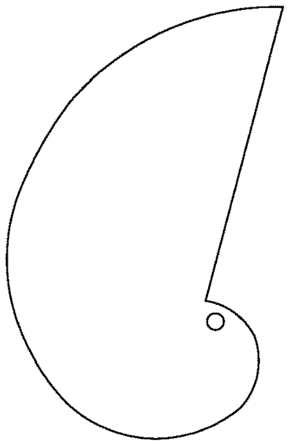
Fig. 1 Prior Art
FIG. 1, already described in the technological background, is a schematic representation of a first example of a zero-reset cam of a chronograph mechanism of the prior art.
Figure 2:
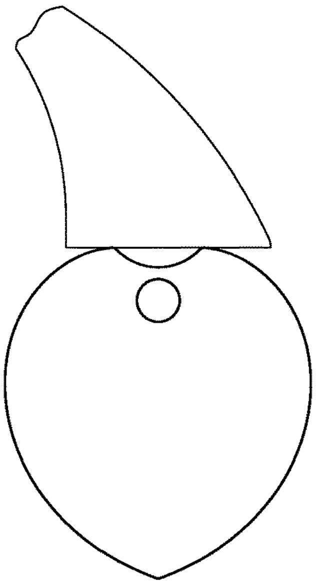
Fig. 2 Prior Art
FIG. 2, already described in the technological background, is a schematic representation of a second example of a zero-reset cam of a chronograph mechanism of the prior art.

As illustrated in FIGS. 2 and 5, the retaining member 64 comprises a portion integral with the plate 2 and a resilient portion arranged to exert the retaining force against the actuation of the zero-reset control 60. The resilient portion is configured to deform when a force greater than the retaining force is applied to the zero-reset control 60, thus releasing the full movement of the zero-reset control 60, enabling the hammer 50 to move as far as its zero-reset position (FIG. 5). The zero-reset control 60 comprises, for example, a stud 65 designed to rest on the resilient portion of the retaining member 64.

More specifically, the stud 65 rests against a retaining notch formed at the free end of the resilient portion of the retaining member 64. The retaining notch has a retaining surface and a tilting point beyond which the retaining member 64 allows rapid, unimpeded actuation of the zero-reset control 60, thus enabling the hammer 50 to be fully actuated until the hammer 50 comes into contact with the zero-reset cams 215, 225 of the chronograph counters 21, 22 and these cams are repositioned in their reference position.

The hammer 50 comprises a first arm 510 having, at its free end, an inclined face 512 forming a first bearing surface configured to come into inclined abutment against the cam track 226 of the snail cam 225 of the seconds counter 22. The first arm 510 of the hammer 50 is shown in greater detail in FIGS. 4 and 5.

Figure 6:
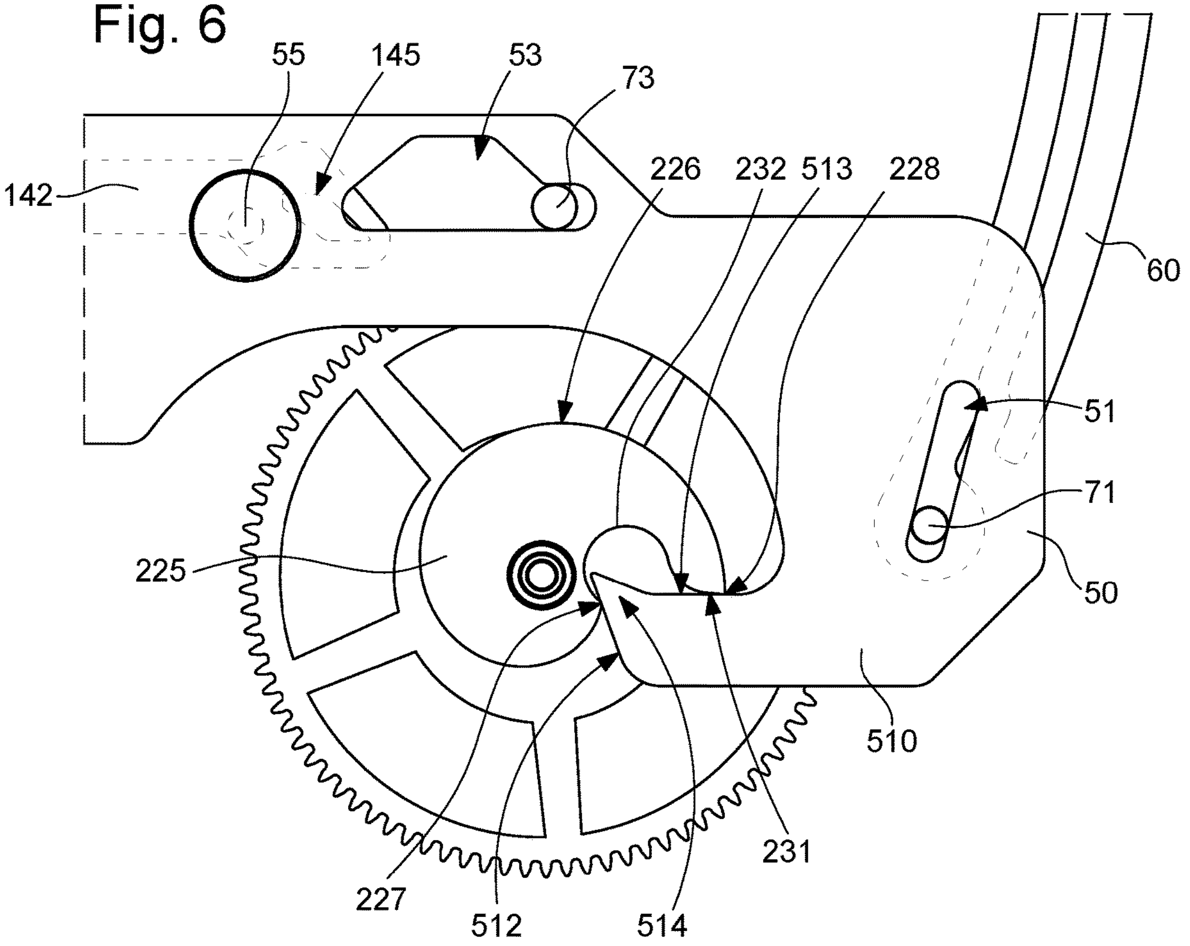
FIG. 6 is a detailed view of a portion of the chronograph mechanism illustrated in FIG. 5, showing in particular the first arm of the zero-reset hammer in contact with a zero-reset member.

In particular, FIG. 4 illustrates the first arm 510 of the hammer 50 in its neutral rest position, while FIG. 6 illustrates the same arm 510 of the hammer 50 in its zero-reset position at the end of the stroke of the hammer 50.

The first arm 510 has a stop surface 513 forming a positioning stop acting as a reference for the angular positioning of the snail cam 225. The stop surface 513 stops the rotation of the snail cam 225 when it is reset to zero, when the bearing surface 231 and/or the distal end 228 of the cam track 226 comes into contact with the stop surface 513, thus positioning the snail cam 225 in its reference position.

The inclined face 512 of the first arm 510, together with the stop surface 513, forms an end beak 514. The end beak 514 forms a protrusion extending the inclined face 512 and projecting from the stop surface 513.

Thus, the first arm 510 of the hammer 50 has a different shape to the horse's hoof shape known from the prior art.

The end beak 514 ensures sufficient overlap between the inclined face 512 of the arm 510 and the cam track 226 during the zero-reset operation, particularly when the snail cam 225 is in a critical position, i.e. when it is already in its reference position or in a position extremely close to its reference position. Indeed, in these particular positions, and with a hammer in the conventional shape of a horse's hoof, the arm 510 can "slip" and push the snail cam instead of rotating it in the normal zero-reset direction. This phenomenon can be perceived by the user as a counter hand that moves backwards instead of rotating in the normal zero-reset direction, in this case clockwise.

Thus, with such an end beak 514, the contact surface of the inclined face 512 is extended and it is ensured that the snail cam 225 is set in motion, whatever its angular position, when the zero-reset control 60 of the chronograph mechanism 10 is actuated, and when the hammer 50 strikes the snail cam 225.

The recess 232 in the connection portion 230 of the snail cam 225 receives and houses the end beak 514 of the first arm 510, when the snail cam 225 is in its reference position and when the hammer 50 is at the end of its stroke, as shown in FIG. 5.

When the end beak 514 is housed in the recess 232, the bearing surface 231 of the snail cam 225, or at least the distal end 228 of the cam track 226, is in abutment against the stop surface 513 of the first arm 510 of the hammer 50.

The hammer 50 has a second arm 520 configured to cooperate with the heart cam 215 of the minute counter 21.

As shown in FIGS. 3 and 6, the second arm 520 has a bearing surface 521 with two inclined sides forming a V, the bearing surface 521 being configured to cooperate with the heart cam 215 of the minute counter 21.

In this way, each inclined face of the bearing surface 521 can cooperate with one of the two spirals of the heart shape of the heart cam 215, depending on its relative position when the zero-reset control 60 is actuated. The inclination of each inclined face is configured to generate a driving torque on the shaft 213, which is integral with the chronograph minute hand 214, and to reposition the heart cam 215 in its reference position, in the clockwise or counter-clockwise direction.

The heart cam 215 has a notch between the two spirals to receive the tip formed by the two inclined faces of the bearing surface 521, in order to keep the heart cam 215, and therefore the chronograph minute hand 214, in a stable position in its zero-reset position, thus avoiding the phenomenon of the hand 214 wobbling.

The chronograph mechanism 10, and in particular the resetting of the hands 214, 224 of the counters 21, 22 to zero, takes place as follows.

When operated by the user, and when a force greater than the retaining force of the retaining member 64 is applied to the zero-reset control 60, the zero-reset control is released and allows the hammer 50 to move rapidly and fully to its zero-reset position, illustrated in FIG. 5.

The hammer 50 then moves from its neutral rest position shown in FIG. 3, in which the hammer is not in contact with the zero-reset members 215, 225 of the counters 21, 22, to a zero-reset position shown in FIG. 5, repositioning the zero-reset members 215, 225 of the counters 21, 22 in their reference position, and holding them in a stable position until the zero-reset control 60 is released by the user.

The hammer 50 cooperates with guide members 140 shaped to guide the hammer 50 when the zero-reset control 60 is actuated and when the zero-reset control 60 is released by the user, under the action of the resilient zero-reset element 62, repositioning the zero-reset control 60 in the neutral rest position. In this way, the guide members 140 define and guide the outward movement of the hammer 50 along a first path, and the return movement thereof along a second path.

In particular, the outward movement of the hammer 50 corresponds to the stroke of the hammer 50 from its neutral rest position to its zero-reset position, and conversely the return movement of the hammer 50 corresponds to the stroke of the hammer 50 from its zero-reset position to its neutral rest position.

The return movement of the hammer 50 under the effect of the resilient return of the resilient zero-reset element 62 has a different path from the path of the outward movement. In particular, this is required in order to release the end beak 514 housed in the recess 232, in the zero-reset position, without altering the angular position of the snail cam 225 during the return movement of the hammer 50. In this way, the resetting of the cam to zero is not affected.

By way of example, the path of the hammer 50 during the outward movement is unidirectional, and the path during the return movement is at least bidirectional.

By way of example, the path of the hammer 50 during the outward movement is rectilinear and unidirectional, and the path during the return movement is rectilinear and in at least two different directions.

By way of example, the path of the hammer 50 during the outward movement is circular, and the path during the return movement can be curvilinear so as to have a different path to the outward movement.

To modify the stroke of the hammer 50 between the outward movement and the return movement, the guide members 140 comprise a guide yoke 142 which can be disengaged as a function of the outward or return movement of the hammer 50, and which cooperates with a guide peg 55 integral with the hammer 50.

In the illustrated example, the disengageable guide yoke 142 is configured to be disengaged, i.e. inactive, during the outward movement of the hammer 50, and to modify the unidirectional path of the hammer 50 during the return movement, in particular to disengage the end beak 514 from the recess 232, and to move it sufficiently far away from the snail cam 225 to avoid any contact between the end beak 514 and the distal end 228 of the cam.

The disengageable guide yoke 142 is rotatable in a plane parallel to the plate 2, about its axis of rotation 12. A guide yoke spring 143 is biased to reposition the guide yoke 142 in its neutral equilibrium position, abutting against a fixed yoke stop 144, also limiting its angular play in a first direction of rotation of the guide yoke 142.

Without any particular action by the hammer 50 on this guide yoke 142, the guide yoke 142 is held in this neutral position, abutting against the yoke stop 144, by the guide yoke spring 143.

The guide yoke 142 carries a guide cam 145 cooperating with the guide peg 55 of the hammer 50.

The guide cam 145 has a first portion 146 configured to allow disengagement of the guide yoke 142, by moving it away from the yoke stop 144, under the advance of the guide peg 55 when the zero-reset control 60 is actuated.

The guide cam 145 has a second portion 147 configured to deflect the path of the hammer 50 when the zero-reset control 60 is released.

Figure 7:
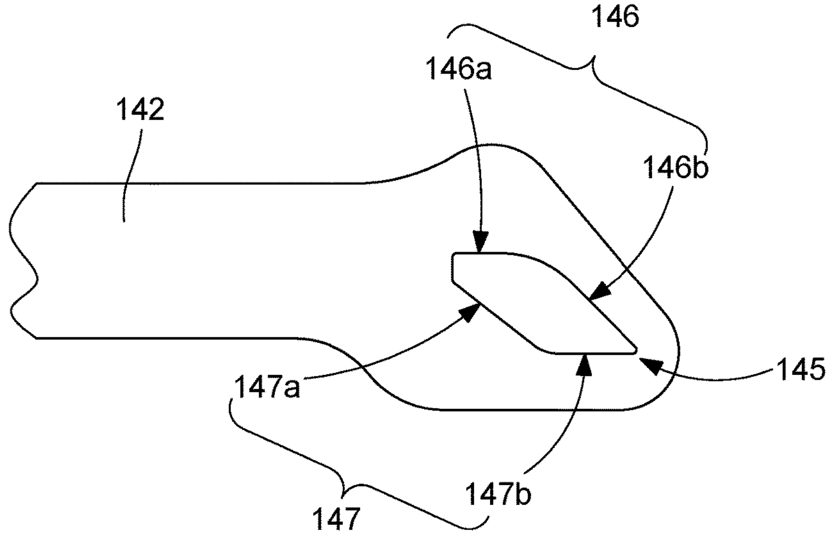
FIG. 7 is a detailed view illustrating the end portion of a disengageable guide yoke of the chronograph mechanism according to the invention, comprising a guide cam for guiding the hammer.

With reference to FIG. 7, which illustrates in greater detail the guide cam 145 of the disengageable guide yoke 142, the guide cam 145 has, for example, the general shape of a rhombus, the first portion 146 of which has a first inclined surface **146*a* for receiving the guide peg 55 during the outward stroke of the hammer 50. When the guide peg 55 comes into contact with the first inclined surface 146*a*, the inclination thereof enables the disengagement yoke to be disengaged as the hammer 50 advances, by rotating the guide yoke 142 about the axis of rotation 12. Disengagement is achieved by exerting a force against the guide yoke spring 143**.

The first portion 146 also includes a first flat section **146*b* of a predetermined length, configured to hold the disengagement yoke in this disengaged position, as long as the guide peg 55 has not passed the guide cam 145**.

The second portion 147 has a second inclined surface **147*a* forming a gradual, gentle slope to receive and guide the guide peg during the return movement of the hammer 50. During the return movement of the hammer 50, when the guide peg 55 comes into contact with this second inclined contact surface 147*a*, with the guide yoke 142 blocked in abutment against the yoke stop 144, the second inclined surface 147*a* deflects the guide peg 55, and therefore the hammer 50, so as to enable the first arm 510 to bypass the snail cam 225. The second portion 147 also includes a second flat section 147*b* of a predetermined length and is configured to hold the hammer 50 away from the snail cam 225, as long as the guide peg 55 has not passed the guide cam 145 during the return movement of the hammer 50**.

The hammer 50 has a first guide slot 51, oblong in shape, cooperating with a first guide pin 71 integral with the zero-reset control 60. The orientation of the first guide slot 51 is determined to transform the rotational motion of the zero-reset control 60 into a substantially linear motion of the hammer 50, while allowing a certain angular displacement between the hammer 50 and the zero-reset control 60. The first guide slot 51 and the first guide pin 71 belong to the guide members 140. This first slot 51 is located at a first end of the hammer 50.

The hammer 50 features a second guide slot 52, oblong in shape, oriented substantially in the direction of travel of the hammer 50. The second guide slot 52 is located at the end of the hammer 50 opposite the zero-reset control 60.

The second guide slot 52 cooperates with a second guide pin 72 that is unmoving, for example integral with the plate 2.

The second guide slot 52 and the second guide pin 72 belong to the guide members 140 and form a pivot-slide connection, guiding and enabling a translational movement along the oblong shape of the second guide slot 52 and a rotational movement of the hammer 50 around the pivot formed by the second guide pin 72.

The hammer 50 also features a third guide slot 53, the outer contour of which delimits the angular play of the hammer 50 during the outward movement and the return movement. The third guide slot 53 cooperates with a third guide pin 73 that is unmoving, for example integral with the plate 2.

During the outward movement of the hammer 50, the zero-reset control 60 initiates a linear displacement of the hammer 50. The hammer 50 is guided in translation both by the second guide pin 72 cooperating with the second guide slot 52 and by the third guide pin 73 cooperating with the third guide slot 53. A hammer spring can be used to exert a force biased to hold the hammer 50 against the third guide pin 73 during the outward stroke, so that the third guide pin 73 is held in contact with the lower contour (as shown in FIG. 3) of the third guide slot 73.

Given the inclination of the first inclined surface 146*a* of the first portion 146, and the constraints imposed by the guide members 140, the displacement, which is linear in this case, of the guide peg 55 during the outward movement of the hammer 50 modifies the angular position of the guide yoke 142, by deflecting the guide cam 145 during the linear advance of the guide peg 55. When the guide peg 55 passes the guide cam 55, the disengageable guide yoke 72 returns to its rest position under the effect of the guide yoke spring 143.

During this outward movement of the hammer 50, the two arms 510, 520 strike the zero-reset members 215, 225, imposing a driving torque on the respective shafts 213, 223 as mentioned above. In this way, the zero-reset members 215, 225 are repositioned in their reference position.

When the user releases the zero-reset yoke 60, under the effect of the resilient zero-reset element 62, the hammer 50 initially moves along a linear path similar to the outward stroke until the guide peg 55 comes into contact with the second portion 147 of the guide cam 145 of the disengageable guide yoke 142.

Given the inclination of the second inclined surface 147*a* of the guide cam 145, and the yoke stop 144 blocking rotation of the disengageable guide yoke 72, the guide peg 55, and therefore the hammer 50, are deflected by the guide cam 145, exerting a force against the hammer spring 50.

This angular offset of the hammer 50, imposed by the shape of the guide cam 145, is made possible in particular by the presence of the third guide slot 53, which gives the hammer 50 angular freedom around the pivot-slide connection formed by the second guide slot 52 and the second guide pin 72.

By way of illustration, FIG. 3 shows the chronograph mechanism 10 according to the invention and in particular the hammer 50 in its neutral rest position, when the zero-reset control 60 has not been operated.

Figure 8:
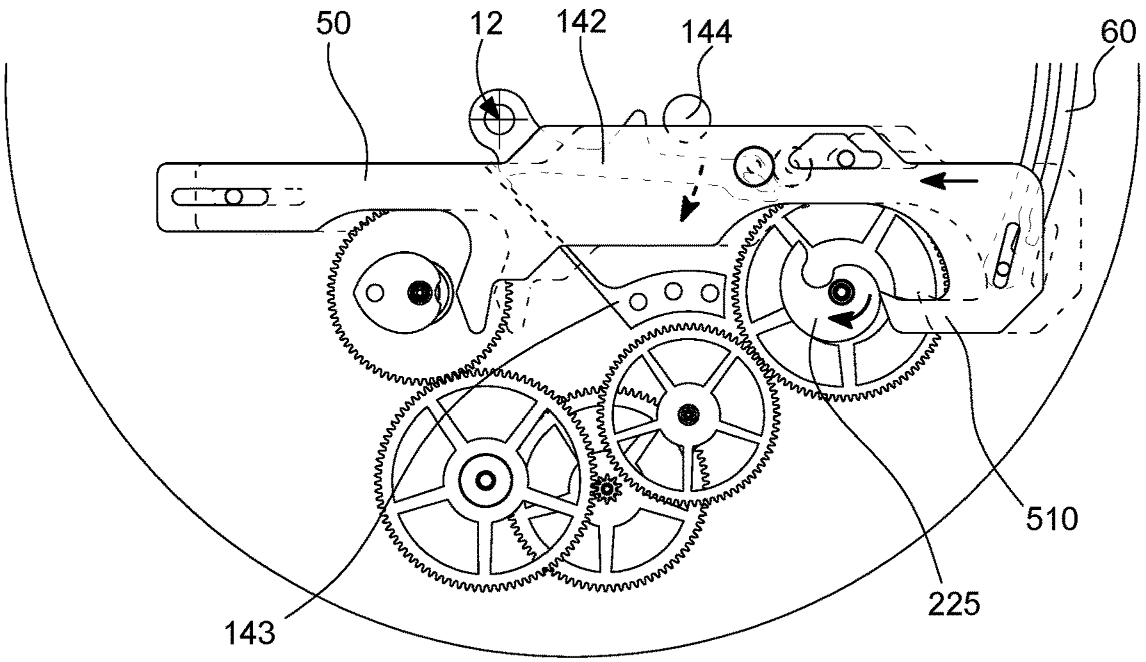
FIG. 8 shows the chronograph mechanism according to the invention in a first intermediate position during the outward movement of the hammer between the neutral rest position shown in FIG. 3 and the activated zero-reset position shown in FIG. 5.

FIG. 8 illustrates the chronograph mechanism 10 according to the invention in an intermediate position between the neutral rest position and the zero-reset position of the hammer 50 during the outward movement of the hammer 50. In this FIG. 8, it can be seen that rotation of the zero-reset control 60 has moved the hammer 50 linearly towards the counters 21, 22. The guide peg 55 deflects the guide yoke 142 away from the yoke stop 144.

The inclined face 512 of the first arm 510 is in contact with the cam track 226 and has initiated a zero-reset of the snail cam 225.

Further movement of the hammer 50 brings it to the position shown in FIG. 5 described above. In this FIG. 5, the arms 510, 520 have struck the zero-reset members 215, 225, which are repositioned in their reference position.

Figure 9:
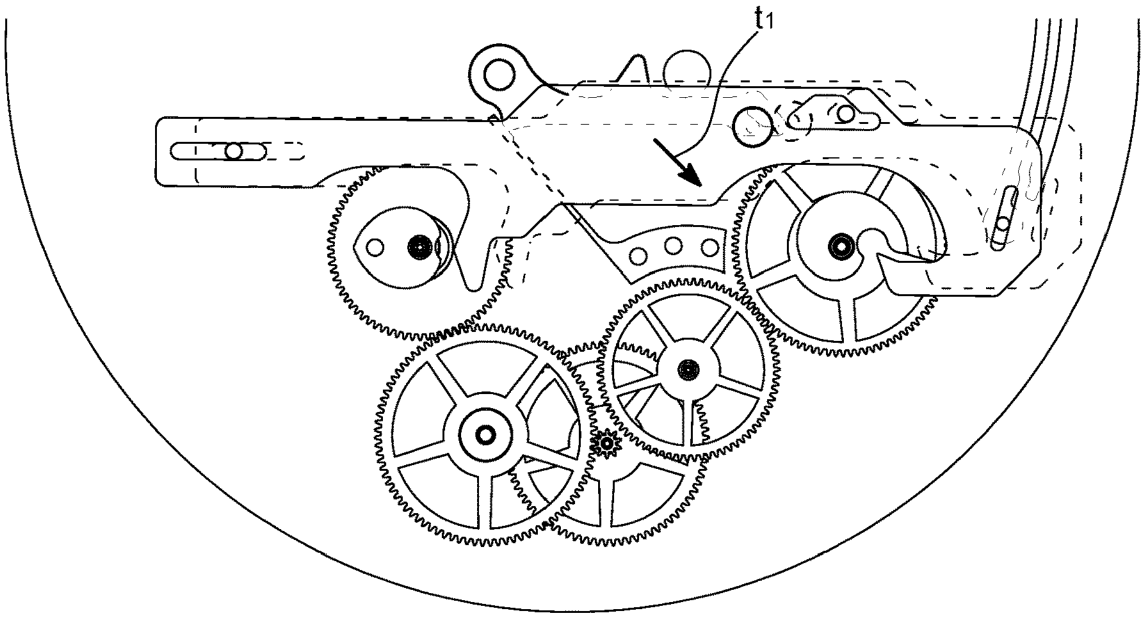
FIG. 9 shows the chronograph mechanism according to the invention in a first intermediate position during the return movement of the hammer between the activated zero-reset position shown in FIG. 5 and the neutral rest position shown in FIG. 3.
Figure 10:
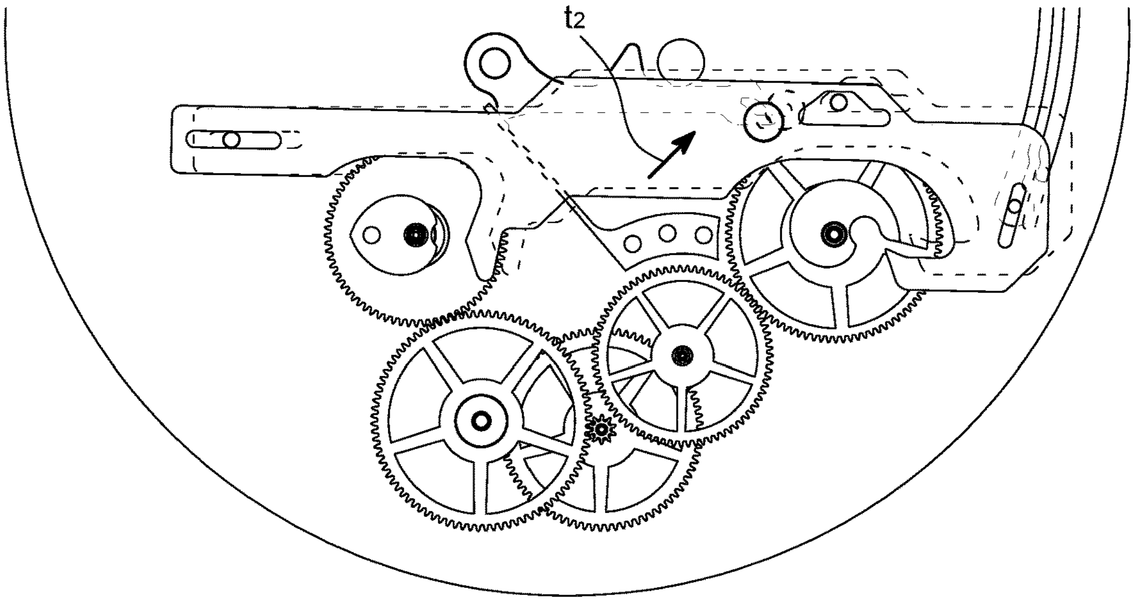
FIG. 10 shows the chronograph mechanism according to the invention in a second intermediate position during the return movement of the hammer between the activated zero-reset position shown in FIG. 5 and the neutral rest position shown in FIG. 3.

FIGS. 9 and 10 illustrate two intermediate positions of the chronograph mechanism 10 according to the invention between the zero-reset position of FIG. 5 and the neutral rest position of FIG. 3, during the return movement of the hammer 50.

More specifically, FIG. 9 shows the position of the hammer 50 when it is deflected by the slope of the second inclined surface 147*a* of the second portion 147 of the guide cam 145. The hammer then follows a path in a first direction t1.

FIG. 10 shows the position of the hammer 50 when it is held away by the second flat section 147*b* of the second portion 147 of the guide cam 145. From this position, when the guide peg 55 is no longer deflected by the guide cam 145, under the effect of the hammer spring (not shown), the hammer 50 returns to abut against the third guide pin 73, travelling in a second direction t2 and then returns to its initial neutral rest position shown in FIG. 3.

Figure 11:
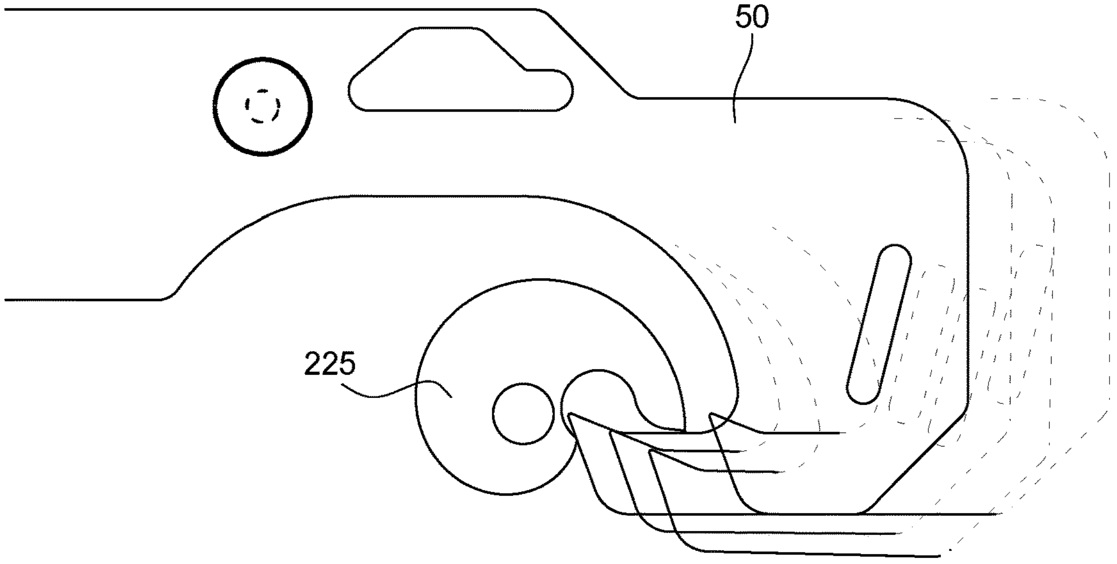
FIG. 11 shows the return movement of the hammer at a seconds counter of the chronograph mechanism according to the invention.

FIG. 11 shows in particular the path of the first arm 510 around the snail cam 225 during the return movement of the hammer 50.

The invention has been particularly described with the hammer moving along a rectilinear path in one direction during the outward movement, and in at least two directions during the return movement. However, the invention is also applicable with a hammer configured to cooperate with the zero-reset control and guide members allowing the hammer to have a circular, curvilinear or complex path during the outward and return movement, with a path in multiple directions during the return movement so as to create an offset in the return path of the first arm by the use of a disengageable guide cam.

As shown in the various figures, the chronograph mechanism 10 includes a column wheel 63 to control the various movements of the various levers that rest against a column or between two columns. As the operation of a chronograph mechanism 10 with such a column wheel 63 is widely known, there is no need to explain further how such a wheel operates.

Of course, the chronograph mechanism 10 can also be a chronograph mechanism having a cam that replaces the column wheel 63 without departing from the scope of the invention.

The invention also relates to a timepiece, for example a wristwatch, comprising such a horological movement.

The invention claimed is:

1. A chronograph mechanism for a horological movement comprising:

a chronograph counter with a shaft and a hand that rotates as one with the shaft, a zero-reset mechanism for resetting said chronograph counter to zero, comprising a zero-reset member integral with the shaft and a hammer shaped to cooperate with the zero-reset member and to generate a driving torque under the action of a zero-reset control until the zero-reset member is positioned in a reference position by rotation in the direction of travel of the chronograph counter;

wherein the zero-reset member is a snail cam having a cam track extending spirally around said shaft of the chronograph counter from a proximal end defining a zone of minimum radius with respect to the shaft to a distal end defining a zone of maximum radius with respect to the shaft;

wherein said hammer can be displaced by the zero-reset control between a rest position in which the hammer is not in contact with the cam path and a zero-reset position in which the hammer is in contact with the cam path and holds the zero-reset member in said reference position, the hammer generating a driving torque on the zero-reset member between the rest position and the zero-reset position;

wherein the hammer cooperates with guide members shaped to guide an outward movement of the hammer along a first path between the rest position and the zero-reset position and to guide a return movement of the hammer along a second path between the zero-reset position and the rest position, the first path and the second path of the hammer being non-coincident.

2. The chronograph mechanism for a horological movement according to claim 1, wherein the guide members are shaped to guide the hammer along a first rectilinear unidirectional path between the rest position and the zero-reset position and along a second multidirectional path having at least two different directions between the zero-reset position and the rest position.

3. The chronograph mechanism for a horological movement according to claim 1, wherein the guide members are shaped to guide the hammer along a first curvilinear path between the rest position and the zero-reset position and along a second path that is different from the first path between the zero-reset position and the rest position.

4. The chronograph mechanism for a horological movement according to claim 1, wherein the guide members comprise a disengageable guide yoke shaped to be inactive during the outward movement of the hammer and active during the return movement of the hammer.

5. The chronograph mechanism for a horological movement according to claim 4, wherein the disengageable guide yoke comprises a guide cam cooperating with a guide peg integral with the hammer, said guide cam comprising a first portion shaped to disengage the guide yoke during the outward movement of the hammer and a second portion shaped to guide the hammer during the return movement of the hammer.

6. The chronograph mechanism for a horological movement according to claim 5, wherein the disengageable guide yoke cooperates with a guide yoke spring biased to reposition said disengageable yoke in a neutral equilibrium position in abutment against a yoke stop.

7. The chronograph mechanism for a horological movement according to claim 1, wherein the hammer comprises an arm having, at its free end, an inclined face configured to come into contact with the cam track of the zero-reset member and generate a driving torque under the action of the zero-reset control until the zero-reset member is positioned in the reference position.

8. The chronograph mechanism for a horological movement according to claim 7, wherein the arm has a stop surface configured to form an angular positioning stop for the zero-reset member during the zero-reset operation.

9. The chronograph mechanism for a horological movement according to claim 8, wherein the arm has an end beak forming a protrusion extending the inclined face, projecting from the stop surface.

10. The chronograph mechanism for a horological movement according to claim 9, wherein the zero-reset member comprises a connecting portion connecting the proximal end and the distal end, and which does not belong to the cam track, said connecting portion comprising a recess forming a clearance for receiving and housing the end beak when the hammer is in the zero-reset position.

11. The chronograph mechanism for a horological movement according to claim 10, wherein the guide members comprise a disengageable guide yoke shaped to be inactive during the outward movement of the hammer and active during the return movement of the hammer; wherein the disengageable guide yoke comprises a guide cam cooperating with a guide peg integral with the hammer, said guide cam comprising a first portion shaped to disengage the guide yoke during the outward movement of the hammer and a second portion shaped to guide the hammer during the return movement of the hammer and wherein the second portion of the guide cam is shaped to disengage the end beak from the recess during the return movement of the hammer and so that the end beak bypasses the distal end of the zero-reset member.

12. The chronograph mechanism for a horological movement according to claim 1, wherein the chronograph counter is a seconds counter.

13. The chronograph mechanism for a horological movement according to claim 12, wherein said chronograph comprises a minute counter having a minute counter shaft, a minutes hand rotating as one with the minute counter shaft, the minute counter shaft carrying a second heart-shaped zero-reset member.

14. The chronograph mechanism for a horological movement according to claim 13, wherein the hammer comprises a second arm cooperating with the second zero-reset member, the second arm being configured to generate a driving torque under the action of the zero-reset control until the second zero-reset member is positioned in a reference position.

15. A horological movement comprising a chronograph mechanism according to claim 1.

* * * * *